United States Patent
Nakayama

(10) Patent No.: US 10,112,309 B2
(45) Date of Patent: Oct. 30, 2018

(54) GRIPPING DEVICE ATTACHED TO ROBOT

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/843,103

(22) Filed: Dec. 15, 2017

(65) Prior Publication Data

US 2018/0169870 A1    Jun. 21, 2018

(30) Foreign Application Priority Data

Dec. 16, 2016    (JP) .................................. 2016-244802

(51) Int. Cl.
| | | |
|---|---|---|
| B25J 15/08 | (2006.01) | |
| B25J 15/10 | (2006.01) | |
| B25J 15/00 | (2006.01) | |

(52) U.S. Cl.
CPC ......... B25J 15/106 (2013.01); B25J 15/0033 (2013.01); B25J 15/10 (2013.01)

(58) Field of Classification Search
CPC ................ B25J 15/0028; B25J 15/0033; B25J 15/0206; B25J 15/0253; B25J 15/08; B25J 15/10; B25J 15/103; B25J 15/106; Y10S 294/902; Y10S 901/38
USPC .............................................. 294/103.1, 106
See application file for complete search history.

(56) References Cited

U.S. PATENT DOCUMENTS

| | | | | |
|---|---|---|---|---|
| 4,268,217 A | * | 5/1981 | Perreault ................. | B66C 1/585 294/104 |
| 4,669,940 A | * | 6/1987 | Englehardt ............... | B65F 3/08 294/106 |
| 4,699,414 A | * | 10/1987 | Jones ..................... | B25J 15/026 294/119.1 |
| 6,494,516 B1 | * | 12/2002 | Bertini ................... | B23P 19/084 294/119.1 |
| 7,537,428 B2 | * | 5/2009 | Hutchinson ............ | B66C 1/585 144/336 |

(Continued)

FOREIGN PATENT DOCUMENTS

| | | |
|---|---|---|
| JP | 60138686 U | 9/1985 |
| JP | 4244393 A | 9/1992 |

(Continued)

OTHER PUBLICATIONS

English Abstract and Machine Translation for Japanese Publication No. 2012-171019 A, published Sep. 10, 2012, 16 pgs.

(Continued)

*Primary Examiner* — Dean J Kramer
(74) *Attorney, Agent, or Firm* — Fredrikson & Byron, P.A.

(57) ABSTRACT

A gripper includes a first finger part and a second finger part. The first finger part has a first finger main body part having an opening, and a first fingertip part for contacting a target object to be gripped. The second finger part has a second finger main body part and a second fingertip part for contacting the target object. The first fingertip part and the second fingertip part pinch the target object by moving closer to each other. Further, the second finger part enters the inside of the opening, so that the first finger main body part and the second finger main body part grasp the target object.

10 Claims, 18 Drawing Sheets

(56) References Cited

U.S. PATENT DOCUMENTS

2012/0286533 A1* 11/2012 Mettler ............... B25J 15/0033
294/213

FOREIGN PATENT DOCUMENTS

| JP | 657581 U | 8/1994 |
|----|----------|--------|
| JP | 2002187089 A | 7/2002 |
| JP | 20077806 A | 1/2007 |
| JP | 2007222971 A | 9/2007 |
| JP | 2011115914 A | 6/2011 |
| JP | 2012166297 A | 9/2012 |
| JP | 2012171019 A | 9/2012 |
| JP | 2013169633 A | 9/2013 |
| JP | 2015112651 A | 6/2015 |

OTHER PUBLICATIONS

English Abstract and Machine Translation for Japanese Publication No. 2002-187089 A, published Jul. 2, 2002, 6 pgs.
English Machine Translation for Japanese Publication No. JPS60-138686 U, published Sep. 13, 1985, 5 pgs.
English Abstract and Machine Translation for Japanese Publication No. JPH04-244393 A, published Sep. 1, 1992, 7 pgs.
English Machine Translation for Japanese Publication No. JP06-57581 U, published Aug. 9, 1994, 7 pgs.
English Abstract and Machine Translation for Japanese Publication No. 2007-007806 A, published Jan. 18, 2007, 15 pgs.
English Abstract and Machine Translation for Japanese Publication No. 2007-222971 A, published Sep. 6, 2007, 31 pgs.
English Abstract and Machine Translation for Japanese Publication No. 2011-115914 A, published Jun. 16, 2011, 12 pgs.
English Abstract and Machine Translation for Japanese Publication No. 2012-166297 A, published Sep. 6, 2012, 23 pgs.
English Abstract and Machine Translation for Japanese Publication No. 2013-169633 A, published Sep. 2, 2013, 10 pgs.
English Abstract and Machine Translation for Japanese Publication No. 2015-112651 A, published Jun. 22, 2015, 19 pgs.

* cited by examiner

PRIOR ART

GRIPPING DEVICE ATTACHED TO ROBOT

BACKGROUND OF THE INVENTION

1. Field of the Invention

The present invention relates to a gripping device attached to a robot.

2. Description of the Related Art

In conventional technologies, the fact that a robot device which has an end effector is used in a product manufacturing factory and the like has been known. The end effector which corresponds to the kind of operation is attached to the tip of a robot. The robot devices can transfer target objects to be gripped, or perform welding.

Japanese Unexamined Patent Publication No. 2002-187089A discloses a grasping device which has an upper arm portion and a lower arm portion, in which one arm portion opens or closes. In this grasping device, one arm portion has a conical bit, and the other arm portion has a reception hole for receiving the conical bit.

Japanese Unexamined Patent Publication No. 2012-171019A discloses a hand which is provided with two finger parts for gripping a target object to be gripped. This publication discloses that, in the hand, a rotary member is provided in the portion of the finger part, which grips the target object.

SUMMARY OF THE INVENTION

A robot device can perform various operations by replacing an end effector. The use of a gripper as an end effector enables gripping of various kinds of target objects to be gripped. When, for example, an operation for attaching a cable harness to a predetermined component is performed, an operation for grasping and lifting a bundle of linear members and an operation for fitting a connector to a predetermined component are necessary. The operation for grasping and lifting the linear members requires a gripper which can grasp the linear members. On the other hand, the operation for fitting the connector to the predetermined component requires a gripper which can pinch the connector.

In conventional technologies, it is difficult to perform, by a single gripper, an operation for grasping a soft target object such as the bundle of linear members and an operation for pinching a small target object such as the connector. Thus, it is necessary to prepare grippers which are suitable for the respective operations. Further, it is necessary to replace a gripper which is attached to the robot every time the content of the work is changed. For example, it is necessary to replace the gripper by an ATC (Automatic Tool Changer) every time the content of the work is changed.

As seen above, if the kind of target object to be gripped varies, it is necessary to use a different gripper which is suitable for gripping the target object. When the operation for grasping the target object and the operation for pinching the target object are performed in the robot device, it is necessary to use different grippers which are suitable for the operations. In addition to a net operation time, a time for replacing the gripper is additionally required, and there was the problem that the total operation time of the robot device increases.

A gripping device according to the present invention is attached to a robot. The gripping device includes a first finger part for contacting one side of a target object to be gripped, a second finger part for contacting the other side of the target object, which is opposed to the first finger part, and a base part for supporting the first finger part and the second finger part. The gripping device includes a drive part for driving at least one of the first finger part and the second finger part. The first finger part includes a first finger main body part which is supported by the base part and which has an opening, and a first fingertip part for contacting the target object, which is disposed at an end of the first finger main body part. The second finger part includes a second finger main body part supported by the base part, and a second fingertip part for contacting the target object, which is disposed at an end of the second finger main body part. The first finger part and the second finger part are formed so that, when the drive part is driven based on a first motion command, the first fingertip part and the second fingertip part move closer to each other, and the first fingertip part and the second fingertip part grip the target object. Further, the first finger part and the second finger part are also formed so as to grip the target object when the drive part is driven based on a second motion command, with at least a part of the second finger part entering the inside of the opening, and the first finger main body part and the second finger main body part being in contact with the target object.

In the above invention, the portion of the second fingertip part, which contacts the target object, can have the same shape as the portion of the first fingertip part, which contacts the target object.

In the above invention, the second finger part can be formed so as to move in a direction in which the second finger part is closer to or away from the first finger part. The second finger part can also be formed so that the length of the portion which projects from the base part can be changed.

In the above invention, the first finger part can include first rotary joints having rotation axes which are perpendicular to the direction in which the first finger part extends and which are parallel to the gripping surface of the first finger part. The direction of the first fingertip part and the direction of the first finger main body part can be changed at the first rotary joints.

In the above invention, the second finger part can include second rotary joints having rotation axes which are perpendicular to the direction in which the second finger part extends and which are parallel to the gripping surface of the second finger part. The direction of the second fingertip part and the direction of the second finger main body part can be changed at the second rotary joints, and the second finger part can enter the inside of the opening of the first finger part.

In the above invention, the first finger main body part can include a pair of the first rotary joints which simultaneously rotate the first fingertip part when the direction of the first fingertip part and the direction of the first finger main body part are changed. The paired first rotary joints can be coaxially arranged and spaced from each other in the direction in which their rotation axes extend.

In the above invention, the gripping device can be provided with a third finger part including a third finger main body part which is supported by the base part, and a third fingertip part which is disposed at an end of the third finger main body part and which contacts the target object. The gripping device can be provided with a fourth finger part including a fourth finger main body part which is opposed to the third finger part and which is supported by the base part, and a fourth fingertip part which is disposed at an end of the fourth finger main body part and which contacts the target object. The gripping device can be provided with a drive part for driving at least one of the third finger part and the fourth finger part. The third finger part and the fourth finger part can move closer to each other in a direction which is perpendicular to the direction in which the first finger part and the second finger part move closer to and away from each other, in order to grip the target object.

In the above invention, the third finger part can include third rotary joints having rotation axes which are perpendicular to the direction in which the third finger part extends and which are parallel to the gripping surface of the third finger part. The direction of the third fingertip part and the direction of the third finger main body part can be changed at the third rotary joints.

In the above invention, the fourth finger part can include fourth rotary joints having rotation axes which are perpendicular to the direction in which the fourth finger part extends and which are parallel to the gripping surface of the fourth finger part. The direction of the fourth fingertip part and the direction of the fourth finger main body part can be changed at the fourth rotary joints.

In the above invention, the gripping device can include an antiskid member which is disposed on at least one of the gripping surfaces for contacting the target object.

DETAILED DESCRIPTION

With reference to FIG. 1 to FIG. 19, a gripping device in an embodiment will be described. The gripping device is an end effector which is attached to a robot. The gripping device of the present embodiment has a function for gripping a target object to be gripped (workpiece) by pinching the target object as well as a function for gripping the target object by grasping the target object.

Figure 1:
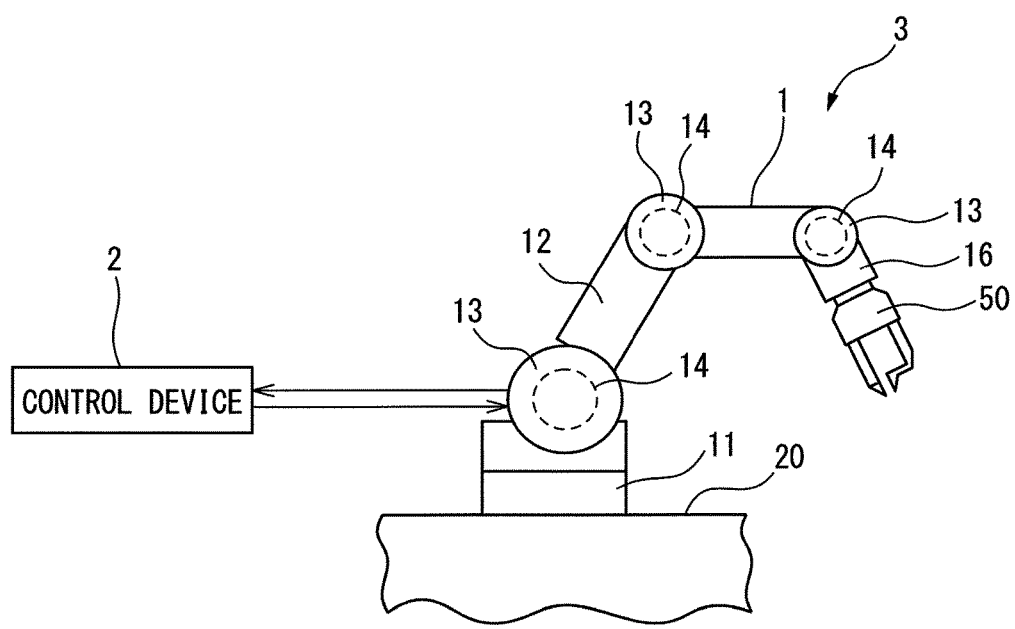
FIG. 1 is a schematic view of a robot device in an embodiment.

FIG. 1 is a schematic view of a robot device in the present embodiment. The robot device 3 is provided with a robot 1 for transferring a workpiece as the target object for which an operation is performed, and a control device 2 for controlling the robot 1. The robot 1 of the present embodiment is an articulated robot including arms 12 and a plurality of joint parts 13. The robot 1 includes a wrist part 16 supported by the arms 12 via the joint part 13. The robot 1 is provided with a base 11 for supporting the arms 12. The base 11 is secured to an installation surface 20. The robot device 3 of the present embodiment is provided with a gripper 50 as a gripping device which is coupled to the wrist part 16. The gripper 50 has a function for gripping the target object.

Figure 2:
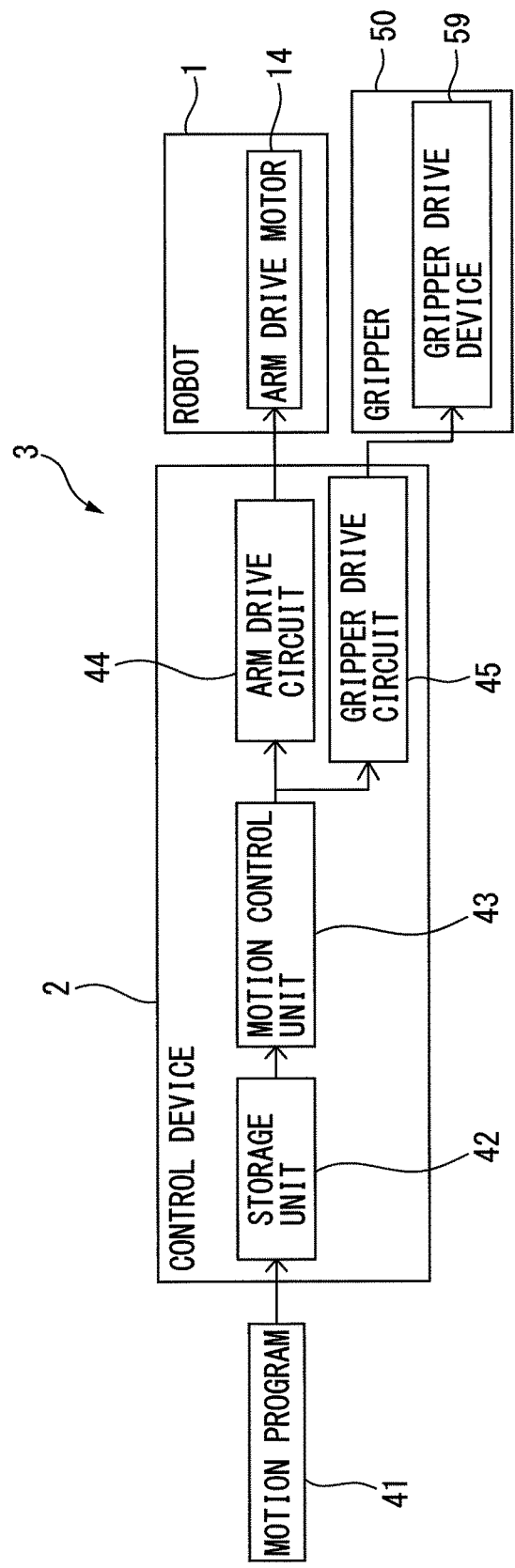
FIG. 2 is a block diagram of the robot device in the embodiment.

FIG. 2 shows a block diagram of the robot device in the present embodiment. With reference to FIG. 1 and FIG. 2, the robot 1 includes arm drive device for driving the respective joint parts 13. The arm drive device includes arm drive motors 14 which are disposed inside the joint parts 13. By driving the arm drive motors 14, the arms 12 and the wrist part 16 are directed in desired directions at the joint parts 13. Further, the robot 1 is formed so that a plurality of arms 12 integrally rotate around a rotation axis which extends in the vertical direction. The arm drive device includes drive motors for rotating the arms 12.

The gripper 50 is provided with a gripper drive device 59 serving as a drive part for driving the gripper 50. The gripper drive device 59 includes a gripper drive motor serving as a drive source for driving a finger part of the gripper 50. As a gripper drive source, in addition to the motor, any devices which can drive the gripper can be adopted. The gripper drive device may be formed so as to drive the finger part of the gripper by, for example, air pressure. In this instance, the gripper drive device can include a cylinder and an air pump for supplying compressed air to the cylinder.

A control device 2 includes an arithmetic processing unit (computer) having a CPU (Central Processing Unit), a RAM (Random Access Memory), a ROM (Read Only Memory), etc., which are interconnected via a bus line. The robot 1 is driven based on a motion command of the control device 2. The arm drive device and the gripper drive device 59 are controlled by the control device 2.

A predetermined motion program 41 for controlling the robot 1 and the gripper 50 is input to the control device 2. The motion program 41 is stored in a storage unit 42. A motion control unit 43 delivers motion commands for driving the robot 1 and the gripper 50 based on the motion program 41. The motion control unit 43 delivers a motion command for driving the arm drive device to an arm drive circuit 44. The arm drive circuit 44 includes an electric circuit for driving the arm drive motors 14. Electricity is supplied to the arm drive motors 14 based on the motion command. The driving of the arm drive motors 14 causes the position and orientation of the robot 1 to be adjusted.

The motion control unit 43 delivers a motion command for driving the gripper drive device 59 to a gripper drive circuit 45 based on the motion program 41. The gripper drive circuit 45 includes an electric circuit for driving the gripper drive device 59. Electricity is supplied to the gripper drive motor based on the motion command. The finger parts of the gripper 50 are activated by driving the gripper drive motor.

Figure 3:
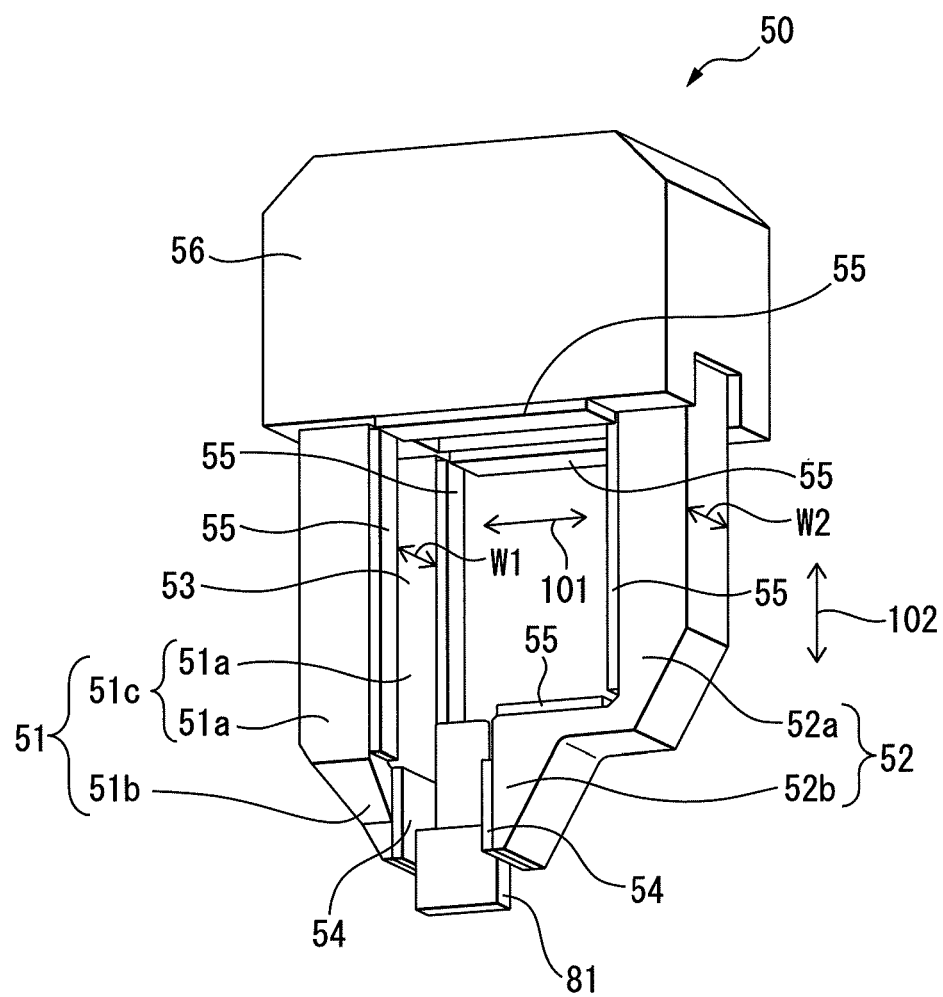
FIG. 3 is a perspective view of a first gripper in the embodiment.
Figure 4:
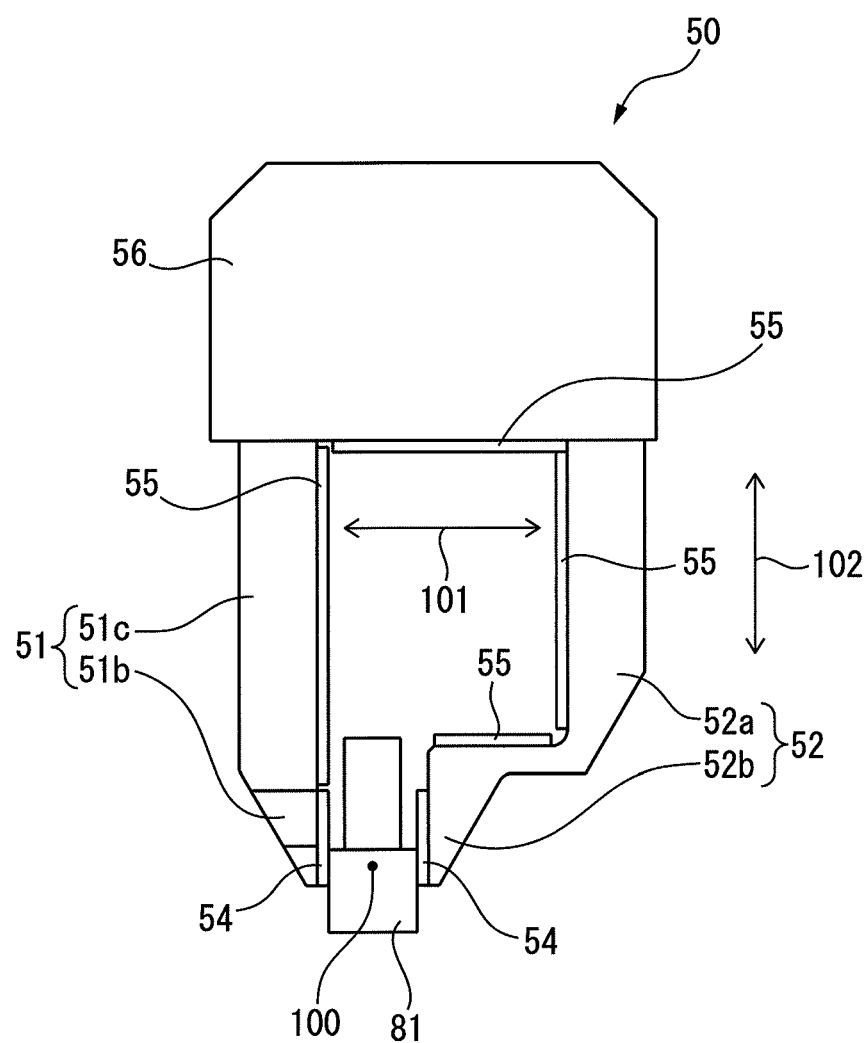
FIG. 4 is a front view of the first gripper in the embodiment.

FIG. 3 shows a perspective view of a first gripper in the present embodiment. FIG. 4 shows a perspective view of the first gripper in the present embodiment. In the present embodiment, as the target object, a cable harness including a connector and a linear member will be described as an example. The cable harness as the target object of the present embodiment includes a connector 81 and a linear member 82 which is connected to the connector 81. The linear member 82 is secured at a predetermined position. The connector 81 is fit to a predetermined portion of another member.

With reference to FIG. 3 and FIG. 4, the first gripper 50 of the present embodiment is provided with a first finger part 51 and a second finger part 52 which is opposed to the first finger part 51. The first finger part 51 can contact one side of the target object. The second finger part 52 can contact the other side of the target object. In FIG. 3 and FIG. 4, the first gripper 50 grips the connector 81 of the cable harness. The first gripper 50 is provided with a base part 56 for supporting the first finger part 51 and the second finger part 52. The first finger part 51 and the second finger part 52 are disposed so as to project from the base part 56. The gripper drive motor of the gripper drive device 59 is disposed inside, for example, the base part 56.

The first finger part 51 can contact one side face of the connector 81. The second finger part 52 can contact the other side face of the connector 81. The gripper drive device 59 drives at least one of the first finger part 51 and the second finger part 52. In the first gripper 50, the gripper drive device 59 drives the second finger part 52. The first finger part 51 is secured to the base part 56.

The second finger part 52 is formed so as to move in two directions which are perpendicular to each other. The gripper drive device 59 moves, as designated by an arrow 101, the second finger part 52 in direction toward and away from the first finger part 51. The second finger part 52 is formed so as to move closer to or away from the first finger part 51. The gripper drive device 59 moves, as designated by an arrow 102, the second finger part 52 in direction in which the second finger part 52 extends. In the second finger part 52, the length of the portion which projects from the base part 56 varies.

The first finger part 51 includes a first finger main body part 51c supported by the base part 56, and a first fingertip part 51b disposed at an end of the first finger main body part 51c. In the present embodiment, the main body of a finger part is referred to as the finger main body part. Further, the tip of a finger part disposed at an end of the finger main body part is referred to as the fingertip part. The fingertip part is a portion for contacting the target object when gripping the target object sous to pinch the same. The first finger main body part 51c has an opening 53. The first fingertip part 51b can contact the connector 81.

The first finger main body part 51c includes a plurality of first bar-like parts 51a which are spaced from one another. In the first gripper 50, two bar-like parts 51a are disposed so that their extending directions are parallel to each other. The first finger main body part 51c which includes two bar-like parts 51a stands on the base part 56. The structure of the first fingertip part 51b is different from that of a comparative example that will be described later. The first fingertip part 51b is not divided into parts corresponding to the first bar-like parts, and is integrally formed. The first fingertip part 51b is formed so as to connect the ends of the first bar-like parts 51a. Further, the first fingertip part 51b of the present embodiment is integrally formed with the first finger main body part 51c. The opening 53 is defined by a plurality of the first bar-like parts 51a, the first fingertip part 51b, and the bottom surface of the base part 56. The width W1 of the opening 53 is larger than the width W2 of the second finger part 52. The opening 53 has a size which is large enough for the insertion of the second finger part 52 as will be described later.

The second finger part 52 has a second finger main body part which is supported by the base part, and a second fingertip part 52b which is disposed at an end of the second finger main body part and can contact the connector 81. A second bar-like part 52a which is formed like a bar functions as the second finger main body part. The second bar-like part 52a has a curved part. The second bar-like part 52a has an L-shape in a side view. In the present embodiment, the second bar-like part 52a and the second fingertip part 52b are integrally formed.

The first finger main body part 51c has, on its surface opposed to the second finger part 52, antiskid members 55. Further, the first fingertip part 51b has, on its surface opposed to the second fingertip part 52b, an antiskid member 54. The second bar-like part 52a serving as the second finger main body part has, on its surface opposed to the first finger part 51, an antiskid member 55. Furthermore, antiskid members 55 are disposed on the surface of the second bar-like part 52a, which is opposed to the base part 56, and the bottom surface of the base part 56. The second fingertip part 52b has, on its surface opposed to the first fingertip part 51b, an antiskid member 54.

As the antiskid members 54 and 55, any members that can prevent the target object from slipping when gripping the target object can be adopted. As the antiskid members 54 and 55, for example, elastic members having elasticity can be adopted. Examples of the elastic member include a sponge or a rubber formed by a polymer compound. Further, as the elastic member, formable plastic can be adopted. Alternatively, as the antiskid members 54 and 55, members having, on their surface, small protrusions can be adopted. Disposing the antiskid members 54 and 55 can prevent the target object from slipping and changing in direction or being accidentally detached when the target object is gripped. Note that the antiskid member 54 and the antiskid members 55 may be made of the same material, or may be made of different materials.

In the first gripper 50, the first fingertip part 51b and the second fingertip part 52b can hold a desired target object. The first gripper 50 can grip the target object by pinching the target object. The motion control unit 43 delivers a first motion command to the gripper drive circuit 45 based on the motion program 41. The gripper drive circuit 45 drives the gripper drive device 59. The second finger part 52 is translated in direction designated by the arrow 102, so that the height of the second fingertip part 52b is equal to the height of the first fingertip part 51b. The second fingertip part 52b is opposed to the first fingertip part 51b.

Subsequently, the second finger part 52 is translated in direction designated by the arrow 101, so that the second fingertip part 52b moves closer to the first fingertip part 51b. The second fingertip part 52b moves toward a grip center point 100. The first fingertip part 51b and the second fingertip part 52b grip the connector 81. The movement of the second finger part 52 is stopped depending on the size of the connector 81. The position at which the second finger part 52 stops is previously set in the motion program 41. Further, the robot device can be provided with a visual sensor. The visual sensor can detect a state of the connector being gripped. The control device may update the motion program based on the information which is obtained from the visual sensor. For example, the control device can correct the position at which the second finger part stops, based on an image which is obtained from the visual sensor.

After the first gripper 50 grips the connector 81, a change in the position and orientation of the robot 1 causes the connector 81 to be fit in a predetermined member.

Figure 5:
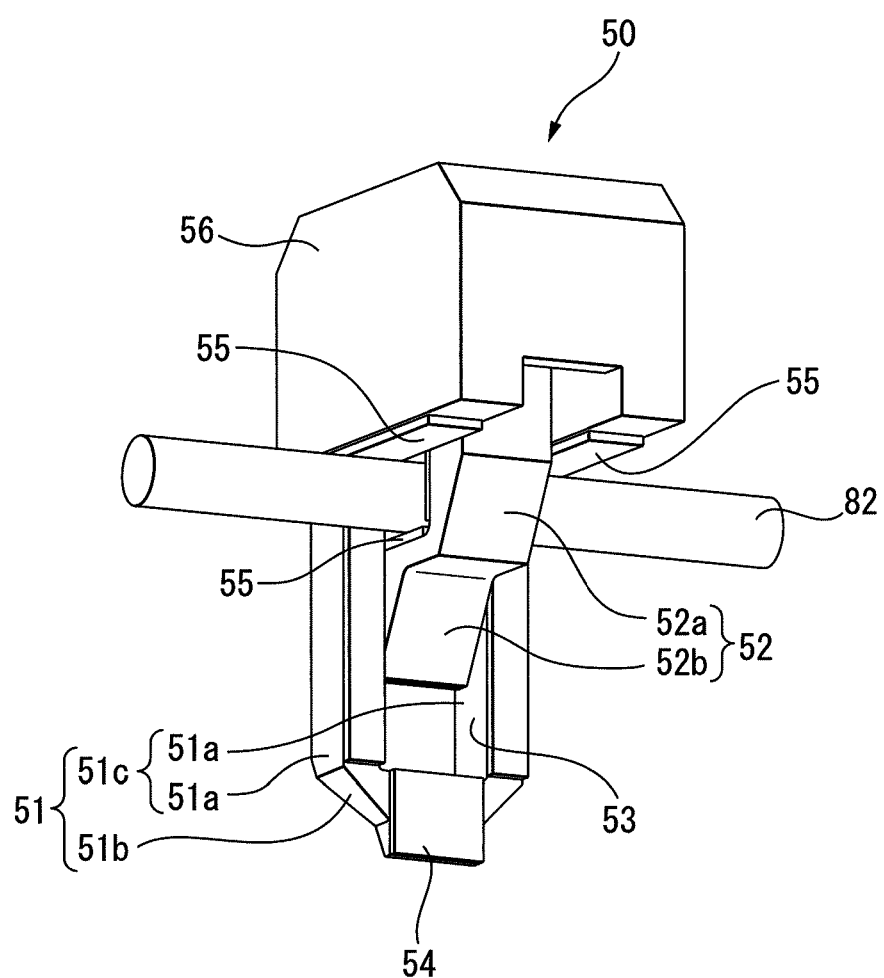
FIG. 5 is a perspective view of the first gripper in the embodiment, which grips a linear member.
Figure 6:
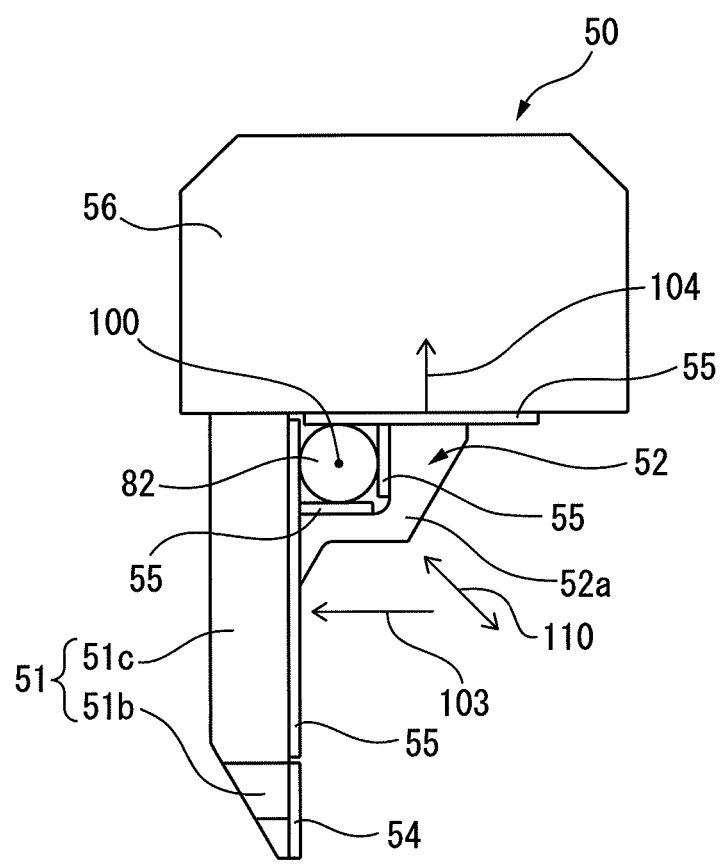
FIG. 6 is a front view of the first gripper in the embodiment, which grips the linear member.

FIG. 5 shows a perspective view of the first gripper in the present embodiment, which grips a linear member. FIG. 6 shows a front view of the first gripper in the present embodiment, which grips a linear member. As a linear member, any target object, which extends linearly, can be adopted. Examples of the linear member include an electric wire, a signal wire, an optical fiber cable, an air supply tube, etc.

With reference to FIG. 5 and FIG. 6, the first gripper 50 in the present embodiment has a function for surrounding and grasping a linear member. In the example shown in FIG. 5, one linear member 82 is shown. However, the first gripper 50 can grip a plurality of linear members at one time. When the number of linear members is one, the linear member can be gripped by being pinched by the fingertip parts. However, it is necessary, in some cases, to grip a bundle of a plurality of linear members each having a small outer diameter. For example, a bundle of unbound multicore wire rods may be gripped. In order to stably grip the bundle of the linear members, it is preferable that the bundle of the linear members is surrounded and gripped by as many surfaces as possible. In other words, it is preferable that the bundle of the linear members is held in a so-called iron grip. When the linear member 82 is gripped, the robot 1 is driven so that the linear member 82 is disposed in a space between the first bar-like parts 51a and the second bar-like part 52a.

The motion control unit 43 delivers a second motion command to the gripper drive circuit 45 based on the motion program 41. The gripper drive circuit 45 drives the gripper drive device 59. The second finger part 52 moves toward the base part 56 as designated by an arrow 104. Further, the second finger part 52 moves toward the first finger part 51 as designated by an arrow 103. The second finger part 52 enters the inside of the opening 53 of the first finger part 51. In this respect, the second finger part 52 may penetrate through the opening 53. As seen above, the second finger part 52 moves toward the grip center point 100. The space, which is surrounded by the first bar-like parts 51a, the second bar-like part 52a, and the base part 56, shrinks, and the linear member 82 can be gripped.

The movement of the second finger part 52 is stopped depending on the size of the linear member 82. The position at which the second finger part 52 stops is previously set in the motion program 41. Further, when the robot device is provided with a visual sensor, the visual sensor can detect a state of the linear member 82 being gripped. The control device may update the motion program based on the information which is obtained from the visual sensor. For example, the control device can correct the position at which the second finger part stops, based on the image which is obtained from the visual sensor. The linear member 82 is gripped while being in contact with the antiskid members 55. The linear member 82 is gripped while being surrounded by first bar-like parts 51a, the second bar-like part 52a, and the base part 56. Thus, the first finger main body part 51c and the second finger main body part (the second bar-like part 52a) can grip the linear member 82. After that, a change in the position and orientation of the robot 1 causes the linear member 82 to be disposed at an arbitrary position.

Note that, in the robot device, a pressure sensor etc. can be provided on the backside of the antiskid members and on the gripping surface-side of the finger parts. The robot device can grip the target object while adjusting the gripping force based on the feedback of pressure information from the pressure sensor. This control is preferable when the linear member is soft. This control enables a linear member such as an electric wire to be safely gripped without disconnection of the electric wire etc.

The first gripper 50 in the present embodiment has a function for causing the fingertip parts to pinch the connector 81, and a function for causing the finger part main bodies to grasp the linear member 82. Thus, when an operation for gripping the linear member 82 and an operation for gripping the connector 81 are performed, it is not necessary to replace the gripper attached to the robot 1. The two operations can be continuously performed. For example, in an operation for attaching a wire harness at a predetermined position, after an operation for attaching the linear member 82 to a predetermined fixation tool is performed, an operation for fitting the connector 81 to a predetermined member is performed in some cases. Even in this operation, the wire harness can be attached at a predetermined position without replacement of the gripper. Thus, the operation time can be reduced.

Figure 7:
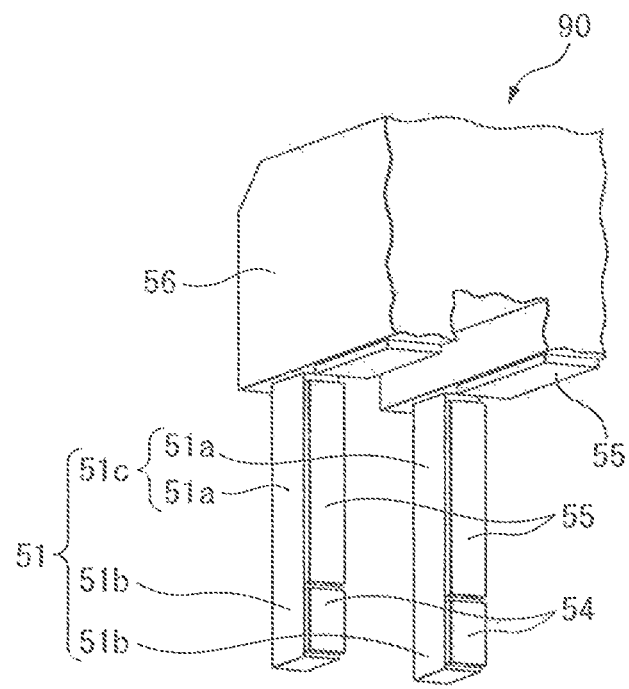
FIG. 7 is a perspective view of a base part and a first finger part of a gripper in a comparative example.

FIG. 7 shows a perspective view of a first finger part of a gripper in a comparative example. A gripper 90 in a comparative example is provided with a first finger part 51. The first finger part 51 includes a first finger main body part 51c which has two separate first bar-like parts 51a. First fingertip parts 51b for contacting the target object are formed at ends of the first bar-like parts 51a. Antiskid members 54 are disposed on the first fingertip parts 51b. In other words, the gripper 90 in the comparative example, a workpiece can be gripped by using the two first fingertip parts 51b.

Figure 8:
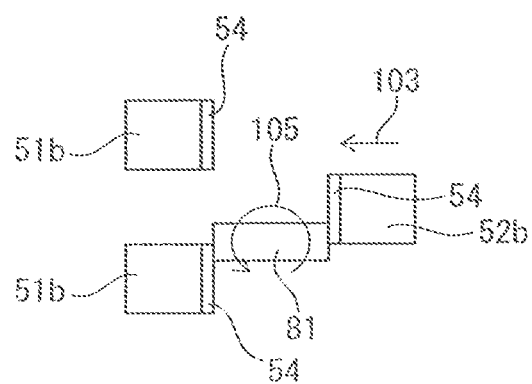
FIG. 8 is a schematic view of the gripper in a comparative example, which grips a connector.

FIG. 8 shows a schematic view of a gripper in a comparative example, which grips a connector. FIG. 8 is a schematic view of the gripper 90 as seen from below. The connector 81 can be gripped by one of the two first fingertip parts 51b and the second fingertip part 52b. When the connector 81 is gripped, the second fingertip part 52b moves in the direction designated by the arrow 103. However, in the gripper 90 in the comparative example, the first fingertip parts 51b are not opposed to the second fingertip part 52b. Thus, when the connector 81 is gripped, a force is applied in a direction in which the connector 81 rotates, as designated by an arrow 105. Consequently, in some cases, the connector 81 cannot be gripped, or the connector 81 is accidentally detached after being gripped. As seen above, in the gripper 90 in the comparative example, the first fingertip parts 51b are divided, and accordingly, the target object cannot be stably gripped in some cases.

With reference to FIG. 3 and FIG. 4, the first gripper 50 in the present embodiment has one fingertip part 51b which is disposed at an end of the first finger main body part 51c. The first finger part 51 has the first fingertip part 51b for connecting the ends of a plurality of bar-like parts 51a. The first fingertip part 51b is disposed so as to be opposed to the second fingertip part 52b. The first fingertip part 51b and the second fingertip part 52b can be arranged in a straight line. Thus, the first gripper 50 can stably grip the connector 81.

Further, the portion of the second fingertip part 52b in the present embodiment, which can contact the target object, has the same shape as the portion of the first fingertip part 51b, which can contact the target object. The antiskid member 54 which is attached to the first fingertip part 51b and the antiskid member 54 which is attached to the second fingertip part 52b have substantially the same shape. Adopting this configuration enables the target object to be stably gripped. If, for example, the widths of the fingertip parts are different from each other, when the target object is gripped, the balance of the force applied to the target object may be lost, and then, the target object may fall down. By substantially conforming the shape of the portion of the first fingertip part which can contact the target object to the shape of the portion of the second fingertip part which can contact the target object, the fingertip parts can stably grip the target object.

Further, the first gripper 50 in the present embodiment can grip the linear member 82 in such a manner as to surround the same. This prevents the linear member 82 from failing to be gripped, or the linear member 82 from accidentally falling down while being transferred. Even when the first fingertip part 51b and the second fingertip part 52b attempt to grip a bundle including a plurality of linear members, they cannot grip some of the linear members in some cases. However, by gripping a bundle of linear members 82 in the space which is surrounded by the first finger main body part 51c, the second bar-like part 52a as the second finger main body part, and the base part 56, the finger part main bodies can grip the bundle of the linear members 82.

Further, in the first gripper 50, by changing the position of the second finger part 52, the linear members having various diameters can be gripped. In other words, a plurality of kinds of linear members which have different diameters can be gripped without replacement of the gripper.

The second finger part 52 of the first gripper 50 in the present embodiment is formed so as to be translated toward the base part 56, but is not limited to this configuration. The second finger part 52 is only required to be formed so that the length of the portion which projects from the base part 56 can be changed. For example, the second finger part 52 may be formed so that the longitudinal length of the portion of the second finger main body part, which projects from the base part 56, can be changed. In other words, the second finger main body part may be formed so as to extend or shrink. Further, the second finger part 52 in the present embodiment is formed so as to linearly move in two directions, but is not limited to this configuration. The second finger part may be formed so as to rotate.

The second finger part in the present embodiment is formed so as to stop based on the motion program. However, in addition to this configuration, pressure sensors may be disposed in the first finger part and the second finger part. For example, the pressure sensors can be disposed on the backside of the antiskid members. The pressure sensors detect a reaction force which is generated when the first finger part and the second finger part come into contact with the target object. Then, the control device can stop the movement of the second finger part when the reaction force which is received from the target object exceeds a predetermined determination value.

Further, by disposing the pressure sensors on the finger parts, the target object can be gripped by a press force (gripping force) depending on the type of target object. When, for example, a fragile target object is gripped, the target object can be gripped with a small press force being applied by the finger parts.

Alternatively, when the target object is tightly gripped, the target object can be gripped with an increased press force being applied by the finger parts.

The gripper drive device 59 for the first gripper 50 in the present embodiment is configured so as to move the second finger part 52 in the directions designated by the arrows 101 and 102, but is not limited to this configuration. The gripper drive device is only required to be formed so as to drive at least one of the first finger part 51 and the second finger part 52. For example, the device may be formed so that the first finger part moves in the direction designated by the arrow 101, and the second finger part moves in the direction designated by the arrow 102. Alternatively, with reference to FIG. 6, the device may be formed so that the second finger part 52 moves in the direction designated by an arrow 110. The second finger part 52 may be formed so as to grip the linear member 82 by the movement in only one direction.

Figure 9:
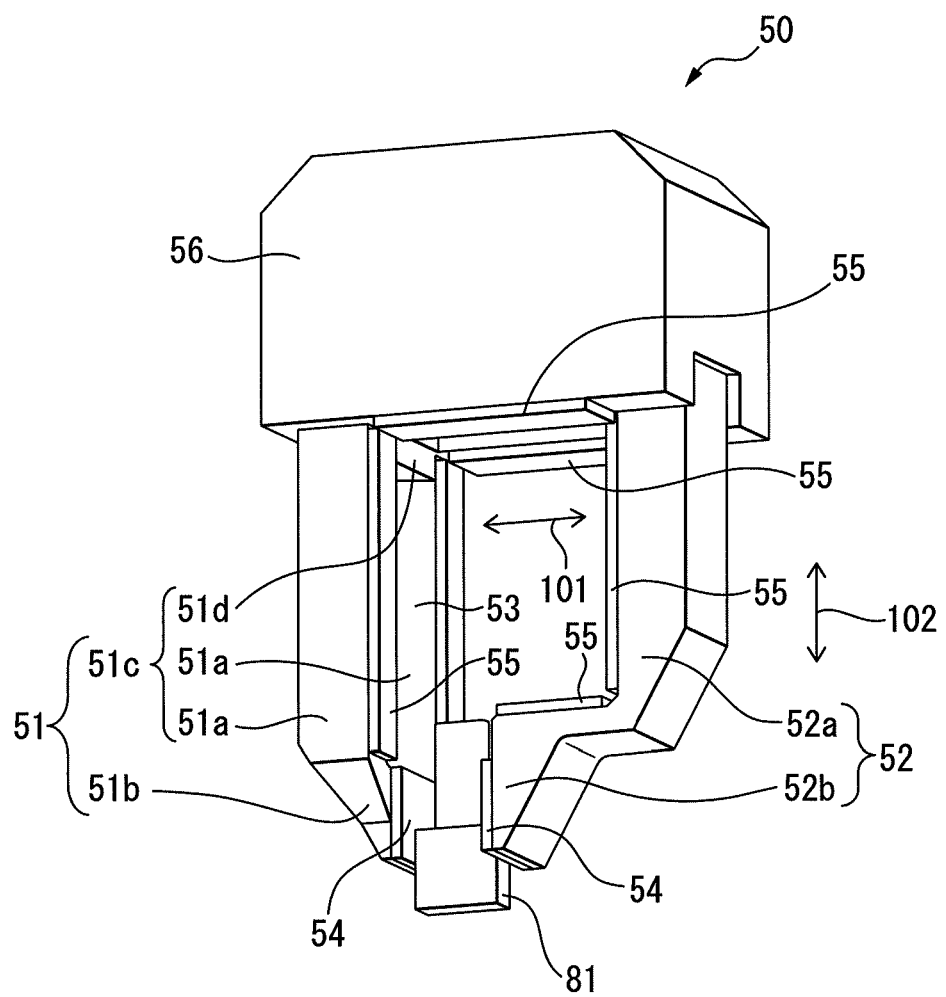
FIG. 9 is a perspective view of a modification of the first gripper in the embodiment.

FIG. 9 shows a perspective view of a modification of the first gripper in the present embodiment. In the modification of the first gripper, the first finger main body part 51c has a fixing part 51d which is secured to the base part 56. Two first bar-like parts 51a are secured to the fixing part 51d. The two first bar-like parts 51a extend from the fixing part 51d. Further, the fixing part 51d and the first bar-like parts 51a in the present embodiment are integrally formed. The opening 53 corresponds to an area surrounded by the two first bar-like parts 51a, the first fingertip part 51b, and the fixing part 51d. As seen above, the present invention can also be applied to the gripper in which the bar-like parts extend from the fixing part.

Figure 10:
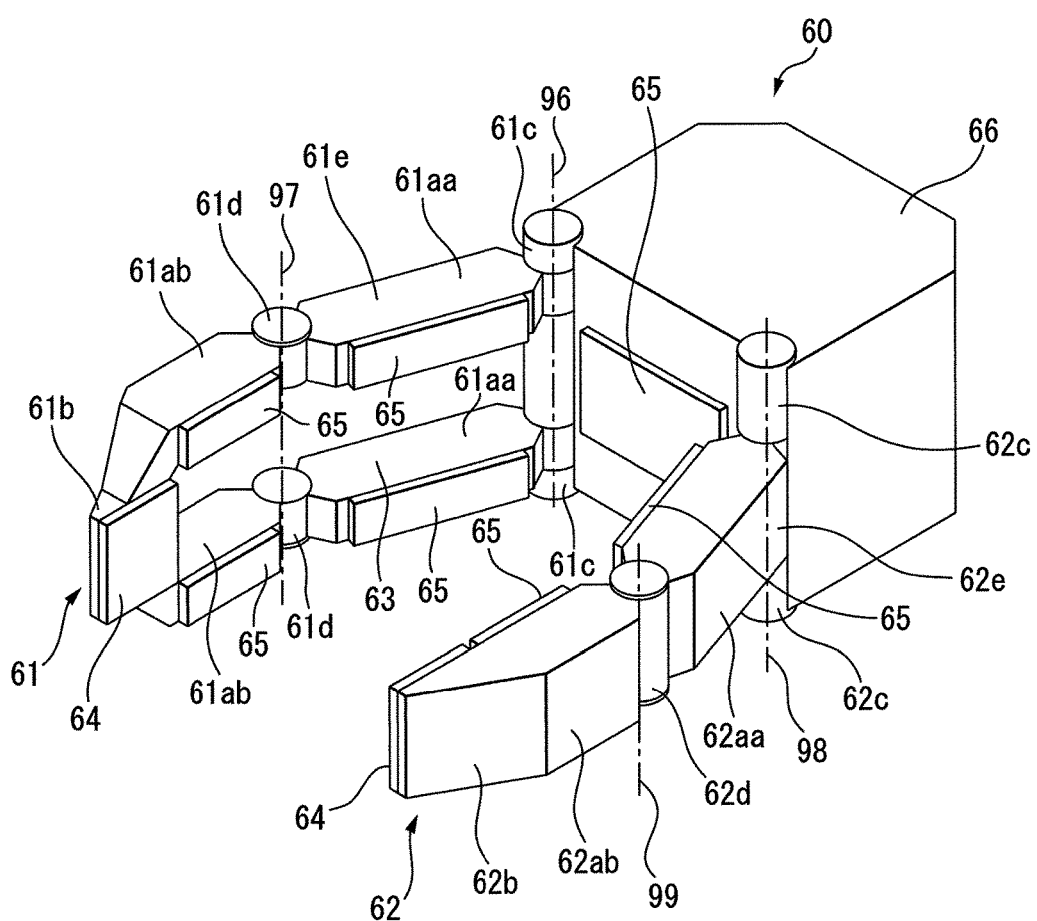
FIG. 10 is a perspective view of a second gripper in the embodiment.
Figure 11:
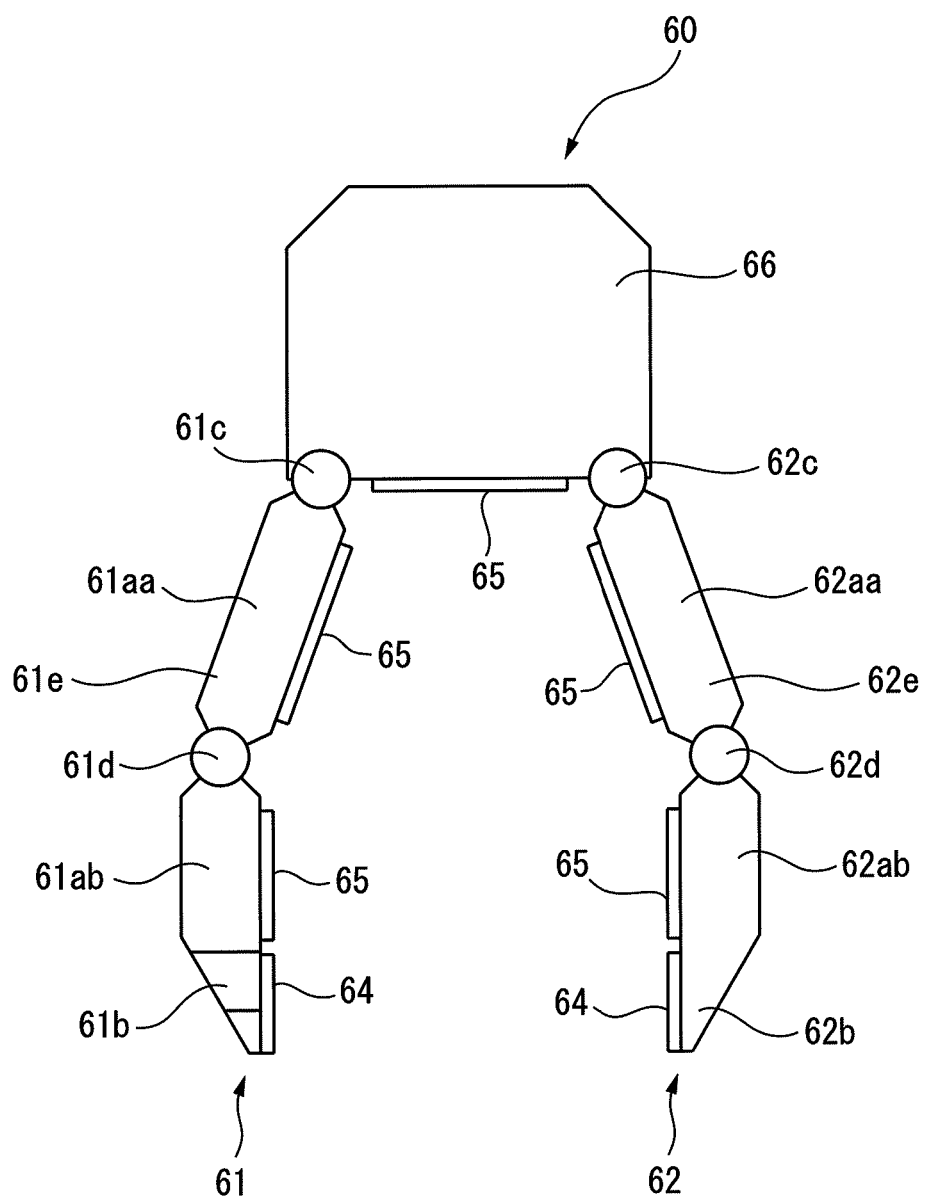
FIG. 11 is a front view of the second gripper in the embodiment.

FIG. 10 shows a perspective view of a second gripper in the present embodiment. FIG. 11 shows a front view of the second gripper in the present embodiment. With reference to FIG. 10 and FIG. 11, in finger part main bodies 61e and 62e of a second gripper 60, finger parts 61 and 62 include rotary joints 61c, 61d, 62c, and 62d each having a rotation axis. Each rotary joint in the present embodiment is a joint part for rotating a member about one rotation axis. The finger parts 61 and 62 are formed so that the directions of bar-like parts 61aa, 61ab, 62aa, and 62ab are respectively changed at the rotary joints 61c, 61d, 62c, and 62d. In short, in the second gripper 60, the direction or shape of the finger part main bodies 61e and 62e varies. Further, the direction of fingertip parts 61b and 62b varies. Drive motors in the present embodiment are disposed inside the rotary joints 61c, 61d, 62c, and 62d. Note that the drive motors for driving the rotary joints may be disposed inside a base part 66. In this instance, belts, wires, or gears etc. can be disposed inside the finger parts, so as to transfer rotation forces of the drive motors to the rotary joints. In short, the drive motors may indirectly drive the rotary joints. The second gripper 60 is provided with a first finger part 61 and a second finger part 62, which are supported by the base part 66. The first finger part 61 and the second finger part 62 are disposed so as to be opposed to each other. The first finger part 61 includes a first finger main body part 61e, and a first fingertip part 61b disposed at an end of the first finger main body part 61e. The first finger main body part 61e includes a plurality of first bar-like parts 61aa and 61ab. The first finger main body part 61e has first rotary joints 61d for connecting the first bar-like parts 61aa to the first bar-like parts 61ab. Sets, each of which is composed of the first bar-like part 61aa and the first bar-like part 61ab which are connected by the first rotary joint 61d, are disposed so as to be spaced from each other. The first finger main body part 61e has first rotary joints 61c for coupling the first bar-like parts 61aa to the base part 66.

The first rotary joints 61c and 61d have rotation axes 96 and 97 which extend in a direction perpendicular to the direction in which the first finger part 61 extends and which are parallel to the gripping surface of the first finger part 61. The gripping surface of the first finger part 61 corresponds to the surfaces of antiskid members 64 and 65. When the gripper drive device is driven, the direction of the first fingertip part 61b and the direction of the first finger main body part 61e are changed in the first rotary joints 61c and 61d.

In the first finger main body part 61e, a pair of the first rotary joints 61d which are opposed to each other is disposed. The two first rotary joints 61d are driven at the same rotation axis 97. In other words, the paired first rotary joints 61d are coaxially arranged at the same rotation axis. The paired first rotary joints 61d simultaneously rotate the first fingertip part 61b when the direction of the first fingertip part 61b and the direction of the first finger main body part 61e are changed. The paired first rotary joints 61d are spaced from each other in the direction in which the rotation axis 97 extends. Further, a pair of the first rotary joints 61c is disposed in the first finger main body part 61e. The two first rotary joints 61c are driven at the same rotation axis 96.

The first fingertip part 61b is disposed so as to connect the ends of the first bar-like parts 61ab spaced from each other. The first fingertip part 61b is integrally formed with the two first bar-like parts 61ab. The first bar-like parts 61aa and 61ab have antiskid members 65 on the surfaces facing the second finger part 62. Further, the first fingertip part 61b has an antiskid member 64 on the surface facing the second finger part 62. The first finger main body part 61e of the first finger part 61 has an opening 63. The opening 63 corresponds to an area which is surrounded by the first bar-like parts 61aa and 61ab, the first fingertip part 61b, and the base part 66. The opening 63 has a size which is large enough for the insertion and passing of the second finger part 62.

The second finger part 62 includes a second finger main body part 62e, and a second fingertip part 62b disposed at an end of the second finger main body part 62e. The second finger main body part 62e includes second bar-like parts 62aa and 62ab and second rotary joints 62c and 62d. The second fingertip part 62b is integrally formed with the second bar-like part 62ab. The second rotary joint 62d connects the second bar-like part 62aa to the second bar-like part 62ab. The second rotary joint 62c connects the second bar-like part 62aa to the base part 66. The second rotary joints 62c and 62d have rotation axes 98 and 99 which are perpendicular to the direction in which the second finger part 62 extends and which are parallel to the gripping surface of the second finger part 62. The gripping surface of the second finger part 62 corresponds to the surfaces of antiskid members 64 and 65. The direction of the second fingertip part 62b and the direction of the second finger main body part 62e are changed at the second rotary joints 62c and 62d.

Figure 12:
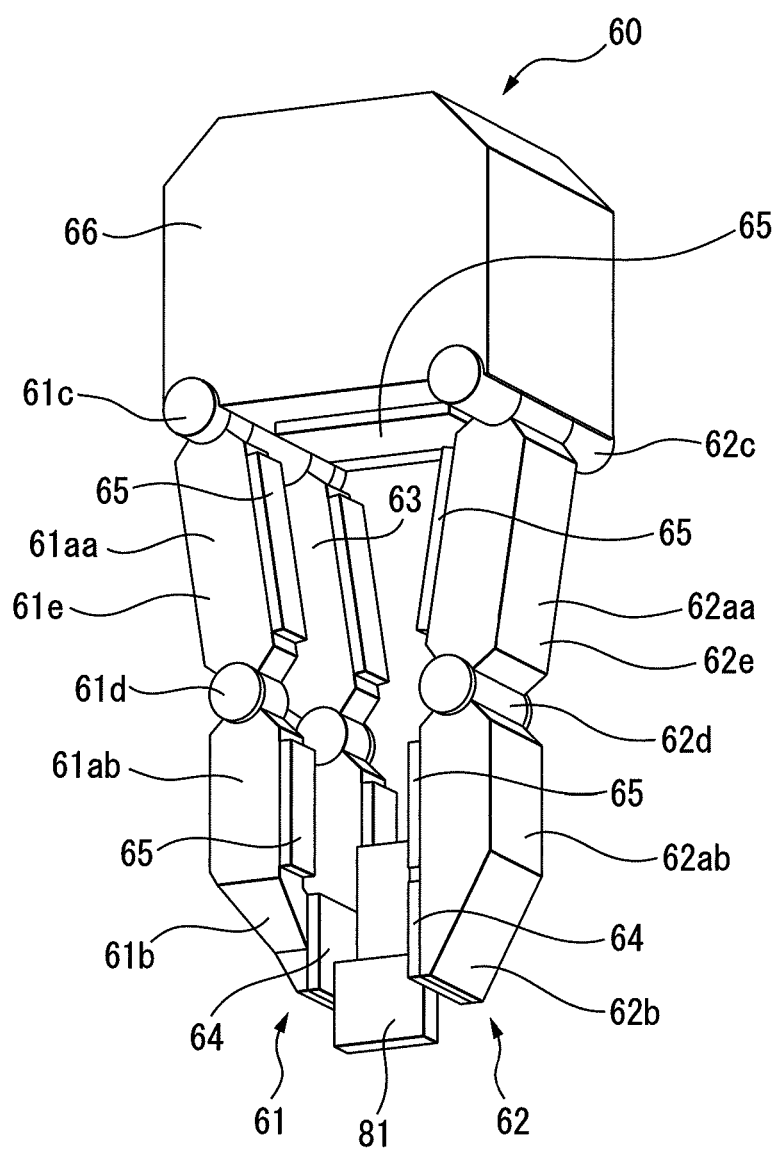
FIG. 12 is a perspective view of the second gripper in the embodiment, which grips a connector.
Figure 13:
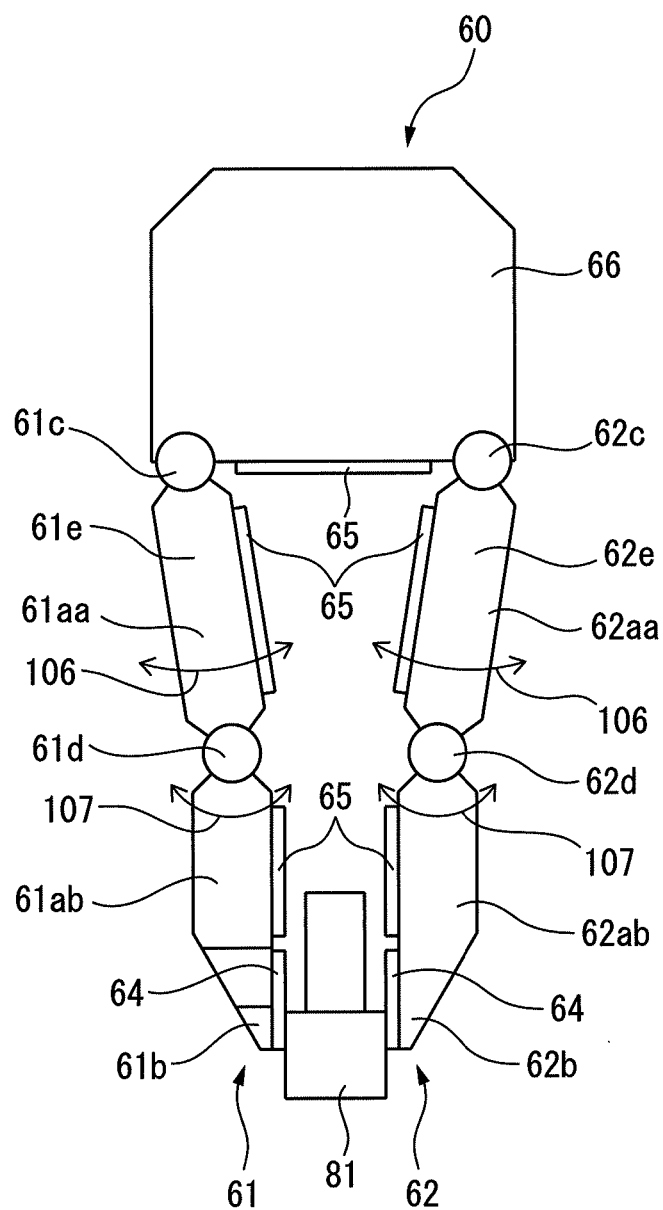
FIG. 13 is a front view of the second gripper in the embodiment, which grips the connector.

The second bar-like parts 62aa and 62ab have antiskid members 65 on the surfaces facing the first finger part 61. Further, the second fingertip part 62b has an antiskid member 64 on the surface facing the first finger part 61. The base part 66 has an antiskid member 65 on the surface on which the first finger part 61 and the second finger part 62 are disposed. FIG. 12 shows a perspective view of the second gripper which grips a connector. FIG. 13 shows a front view of the second gripper which grips a connector. With reference to FIG. 12 and FIG. 13, in the second gripper 60, the bar-like parts 61aa and 62aa respectively pivot about the rotation center in the rotary joints 61c and 62c as designated by arrows 106. In other words, the finger part main bodies 61e and 62e respectively pivot about the rotation center in the rotary joints 61c and 62c. Further, the bar-like parts 61ab and 62ab respectively pivot about the rotation center in the rotary joints 61d and 62d as designated by arrows 107.

The second gripper 60 grips the connector 81 in such a manner as to pinch the connector by using the first fingertip part 61b and the second fingertip part 62b. The rotation angles of the rotary joints 61c, 61d, 62c, and 62d when the connector 81 is gripped can be previously set in the motion program 41. The motion control unit 43 delivers a first motion command to the gripper drive circuit 45 based on the motion program 41. The gripper drive circuit 45 drives the gripper drive device 59. In the present embodiment, the position and orientation of the first finger part 61 and the position and orientation of the second finger part 62 are determined so that the surface of the first fingertip part 61b is set parallel to the surface of the second fingertip part 62b when the connector 81 is gripped. This control enables the second gripper 60 to stably pinch the connector 81.

Note that the position and orientation of the first finger part 61 and the position and orientation of the second finger part 62 when the target object is gripped can be set depending on the shape of the target object. Further, if the robot device is provided with a visual sensor, the visual sensor can detect a state of the connector 81 being gripped. The motion program may be updated based on the information which is obtained from the visual sensor. For example, the control device can correct the position and orientation of the first finger part 61 and the position and orientation of the second finger part 62 based on an image which is obtained from the visual sensor.

Figure 14:
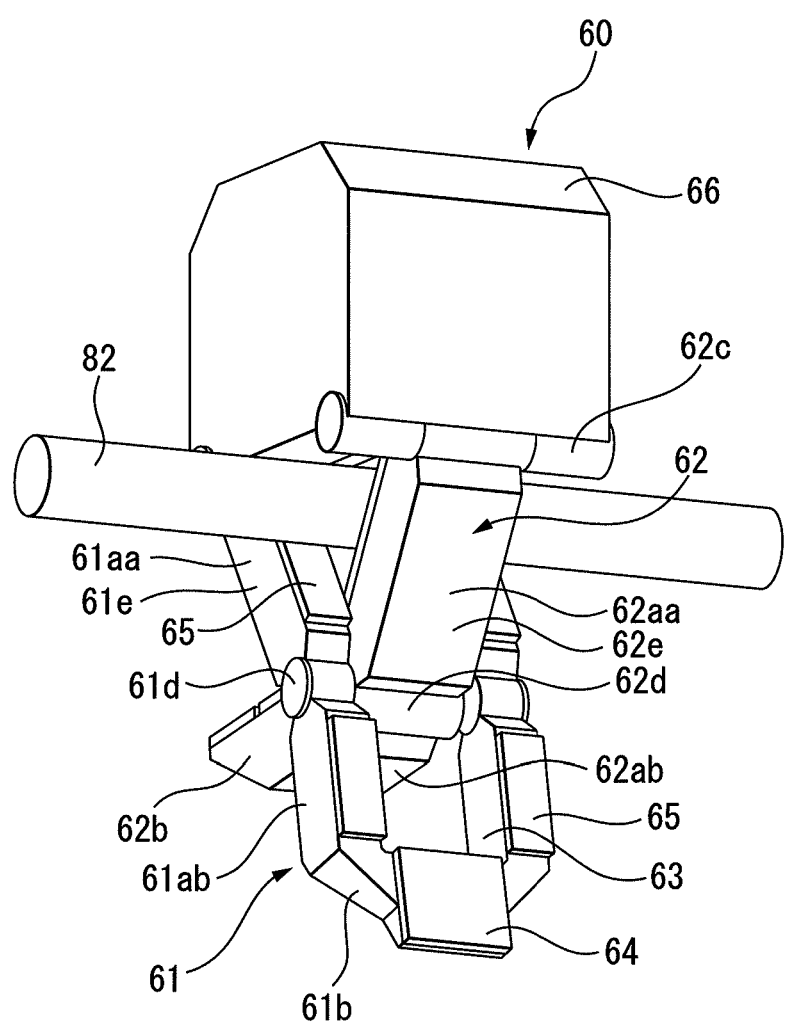
FIG. 14 is a perspective view of the second gripper in the embodiment, which grips the linear member.
Figure 15:
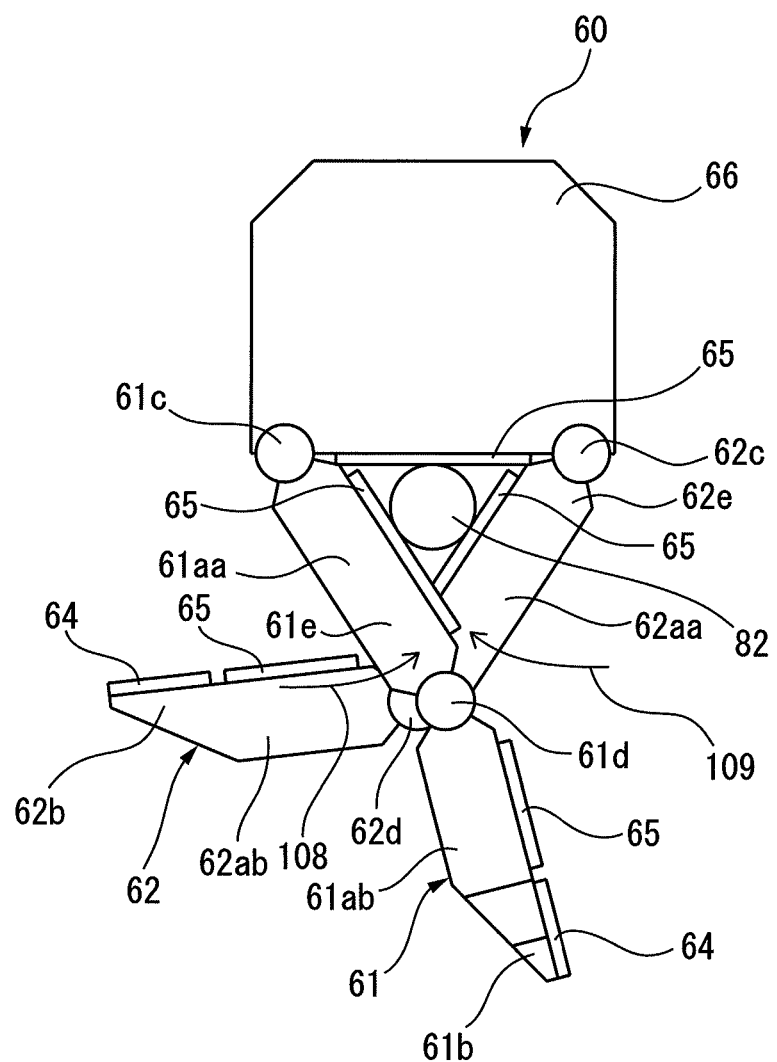
FIG. 15 is a front view of the second gripper in the embodiment, which grips a linear member.

FIG. 14 shows a perspective view of the second gripper which grips the linear member. FIG. 15 shows a front view of the second gripper which grips the linear member. The second gripper 60 can grip the linear member 82 in such a manner as to grasp the linear member by using the finger part main bodies 61e and 62e and the bottom face of the base part 66.

When the linear member 82 is gripped, the motion control unit 43 delivers a second motion command to the gripper drive circuit 45 based on the motion program 41. The gripper drive circuit 45 drives the gripper drive device 59. As designated by an arrow 108, the first finger part 61 pivots toward the second finger part. In the example shown in FIG. 15, the first finger main body part 61e is driven by using the rotary joints 61c and 61d as rotation centers. Specifically, the first bar-like part 61aa pivots. Further, the second finger part 62 pivots toward the first finger part 61. In the example shown in FIG. 15, as designated by an arrow 109, the second finger main body part 62e is driven by using the rotary joints 62c and 62d as rotation centers. The second bar-like parts 62aa and 62ab pivot. The second finger part 62 enters the opening 63. Further, the second finger part 62 penetrates through the opening 63.

The linear member 82 is gripped by a space surrounded by the bottom surface of the base part 66, the first finger main body part 61e of the first finger part 61, and the second finger main body part 62e of the second finger part 62. The orientations of the bar-like parts 61aa, 61ab, 62aa, and 62ab at this time can be previously set in the motion program 41. The orientations of the bar-like parts 61aa, 61ab, 62aa, and 62ab can be set depending on the shape of the target object. Further, if the robot device is provided with a visual sensor, the visual sensor can detect a state of the linear member 82 being gripped. The control device may update the motion program based on the information which is obtained from the visual sensor. For example, the control device can correct the position and orientation of the first finger part and the position and orientation of the second finger part based on an image which is obtained from the visual sensor.

In the second gripper 60, the first finger main body part 61e has the opening 63 and the second finger part 62 enters the opening 63 in the same way as the first gripper 50. By adopting this configuration, the structure of the rotary joints of the finger parts and the control of the finger parts can be simplified. If the first finger main body part has no opening, when a linear member is gripped, it is necessary to control the finger parts so that their motion resembles the motion of a human hand which grips something. For example, the control device is required to bend the second finger part so that the second finger part is disposed inside the first finger part. The rotary joints are required to have structures for largely rotating the second finger part. Further, the control device is required to control the orientation of the finger parts so that the first finger part does not collide with the second finger part. Further, the control device is required to control the complicated motion and the gripping force of the finger parts. As seen above, if the first finger part has no opening, the structure of the rotary joint is complicated, and further, the control thereof is complicated. In contrast, in the second gripper 60 in the present embodiment, the second finger part 62 enters the opening 63 of the first finger part 61, and accordingly, rotary joints having simple structures can be adopted. Further, the control of the first finger part and the second finger part can be simplified.

Specifically, in the second gripper 60 in the present embodiment, the finger parts 61 and 62 can be bent. Then, the linear member 82 is grasped so as to be surrounded. In the second gripper 60, it is not necessary to form the second bar-like part 52a of the second finger part 52 into an L-shape which is formed in the first gripper 50, and accordingly, the size of the gripper can be reduced.

Further, in the second gripper 60 in the present embodiment, the linear members having different diameters can be gripped by changing the position and orientation of the first finger part 61 and the position and orientation of the second finger part 62. In other words, a plurality of kinds of linear members can be gripped without replacement of the gripper.

In the examples shown in FIG. 14 and FIG. 15, the bar-like parts 61aa and 62aa, which pivot on the rotary joints 61c and 62c, grip the linear member 82. When the linear member is gripped, in addition to this configuration, the bar-like parts 61ab and 62ab, which pivot on the rotary joints 61d and 62d, may be used to grip the linear member. For example, if the linear member has a large diameter, or if the bundle of a plurality of linear members has a large diameter, the linear member can be stably gripped by entirely using the finger parts 61 and 62. Note that, regarding the number of rotary joints of the first finger part and the number of rotary joints of the second finger part, any number can be adopted. For example, the second finger part may include three or more rotary joints.

Figure 16:
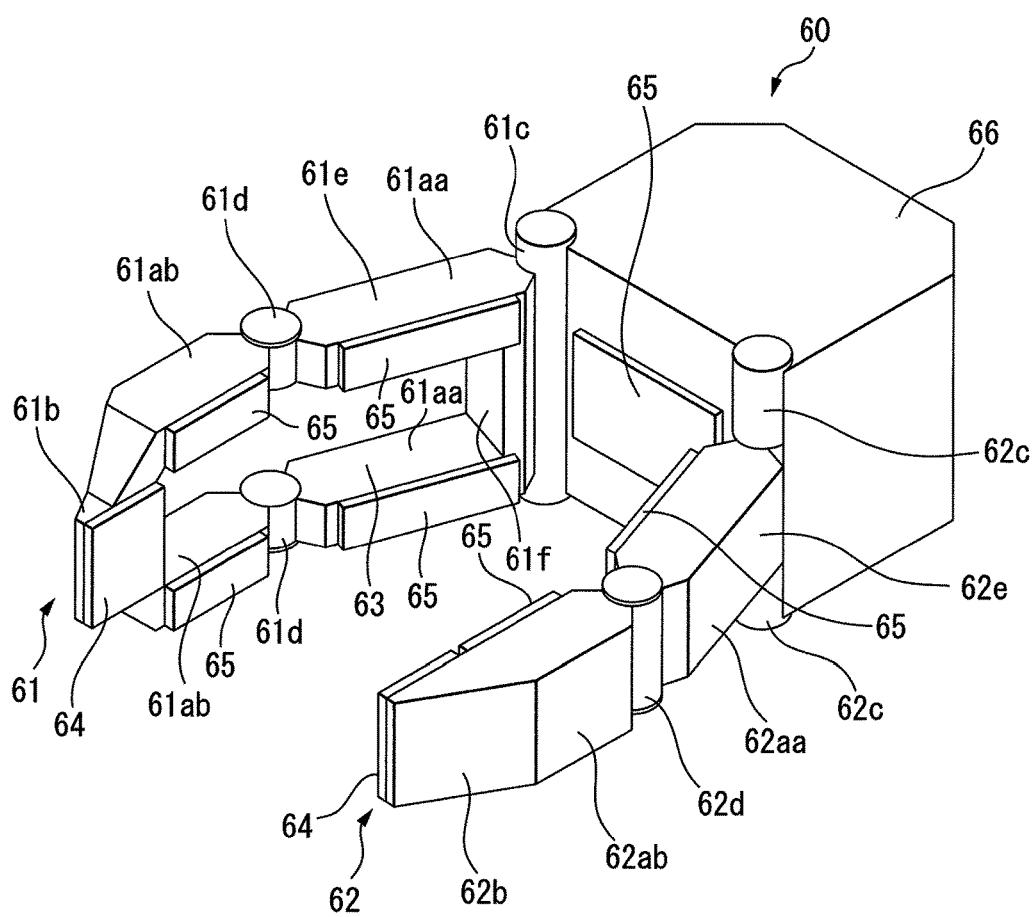
FIG. 16 is a perspective view of a modification of the second gripper in the embodiment.

FIG. 16 shows a perspective view of a modification of the second gripper in the present embodiment. In the modification of the second gripper, the first finger main body part 61e of the first finger part 61 includes a fixing part 61f for securing the first bar-like parts 61aa which are opposed to each other. The fixing part 61f and the two first bar-like parts 61aa are integrally formed. Further, the fixing part 61f is secured to the first rotary joint 61c. In the aforementioned second gripper, in order to couple the first finger main body part 61e to the base part 66, two first rotary joints 61c are coaxially disposed (see FIG. 10). In contrast, in the modification of the second gripper, one first rotary joint 61c for supporting the fixing part 61f is disposed. The first rotary joint 61c may be formed so as to support a plurality of bar-like parts 61aa without being divided into two portions. This configuration simplifies the control of the motion of the first finger main body part 61e in comparison with the second gripper shown in FIG. 10. In the second gripper shown in FIG. 10, two rotary joints 61c are disposed, and accordingly, it is necessary to control the two rotary joints 61c so that two bar-like parts 61aa move in synchronization. Alternatively, it is necessary to control the rotary joints so that, when one rotary joint 61c rotates, the other rotary joint 61c follows the motion of the one rotary joint 61c. If such a complicated control is not performed, there is a possibility that the first finger main body part 61e does not move smoothly. In contrast, in the modification of the second gripper in FIG. 16, the rotary joint is not divided, and accordingly, it is only required to control one rotary joint 61c. Thus, the control of the rotary joint can be easily performed.

The other configurations, operations, and effects of the second gripper are similar to those of the first gripper in the present embodiment.

Figure 17:
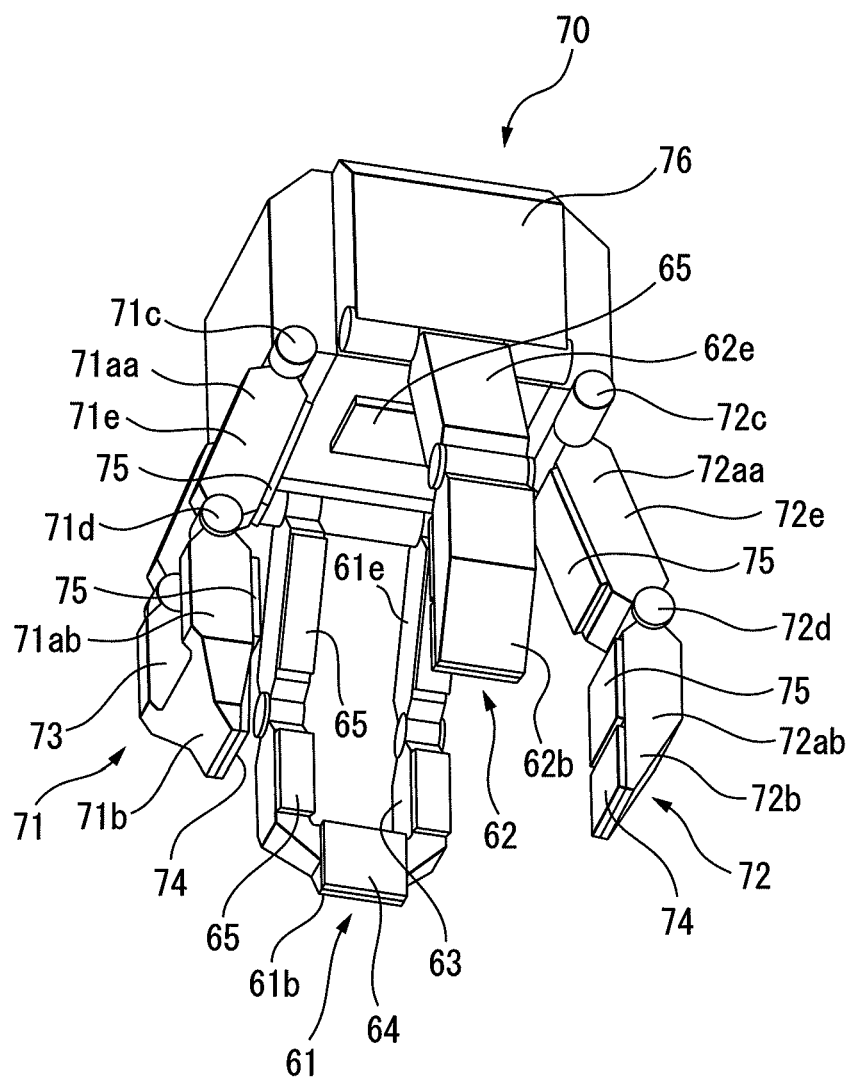
FIG. 17 is a perspective view of a third gripper in the embodiment.

FIG. 17 shows a perspective view of a third gripper in the present embodiment. A third gripper 70 is provided with a third finger part 71 and a fourth finger part 72 in addition to the first finger part 61 and the second finger part 62. The fourth finger part 72 is opposed to the third finger part 71. The direction in which the third finger part 71 is opposed to the fourth finger part 72 is perpendicular to the direction in which the first finger part 61 is opposed to the second finger part 62. The paired finger parts 71 and 72 are formed so as to open or close in the direction perpendicular to the direction in which the paired finger parts 61 and 62 open or close. In other words, the third finger part 71 and the fourth finger part 72 move closer to each other in the direction perpendicular to the direction in which the first finger part 61 moves closer to or away from the second finger part 62, in order to grip the target object. Note that the gripper drive device in the present embodiment is formed so as to drive the third finger part 71 and the fourth finger part 72, but is not limited to this configuration. The gripper drive device can be formed so as to drive at least one of the third finger part and the fourth finger part.

The third finger part 71 has a configuration which is similar to that of the first finger part 61 of the second gripper 60. The third finger part 71 includes a third finger main body part 71e which is supported by a base part 76, and a third fingertip part 71b which is disposed at an end of the third finger main body part 71e and which can contact the target object. The third finger main body part 71e has third rotary joints 71d for connecting third bar-like parts 71aa and third bar-like parts 71ab, and a third rotary joint 71c for connecting the third bar-like parts 71aa to the base part 76. The third rotary joints 71c and 71d have rotation axes which are perpendicular to the direction in which the third finger part 71 extends, and parallel to the gripping surface of the third finger part 71. By driving the gripper drive device 59, the direction of the third fingertip part 71b and the direction of the third finger main body part 71e are changed at the third rotary joints 71c and 71d. The third fingertip part 71b connects the ends of the third bar-like parts 71ab. Further, the third finger main body part 71e has an opening 73 which is surrounded by the third bar-like parts 71aa and 71ab, the third fingertip part 71b, and the bottom surface of the base part 76. In the embodiment shown in FIG. 17, the third finger part 71 has the opening 73, but is not limited to this configuration. The third finger part may not have the opening 73. When the first finger part 61 and the second finger part 62 grip a linear member, the third finger part 71 and the fourth finger part 72 are disposed in the direction in which the linear member extends. Thus, it is difficult to grip the linear member by closing the third finger part 71 and the fourth finger part 72. Accordingly, when the linear member is always gripped by the first finger part 61 and the second finger part 62, the third finger part 71 may not have the opening 73.

The fourth finger part 72 has a configuration similar to that of the second finger part 62 of the second gripper 60. The fourth finger part 72 includes a fourth finger main body part 72e which is supported by the base part 76, and a fourth fingertip part 72b which is disposed at an end of the fourth finger main body part 72e and which can contact the target object. The fourth finger main body part 72e has a fourth rotary joint 72d for connecting a fourth bar-like part 72aa to a fourth bar-like part 72ab, and a fourth rotary joint 72c for connecting the fourth bar-like part 72aa to the base part 76. The fourth rotary joints 72c and 72d have rotation axes which are perpendicular to the direction in which the fourth finger part 72 extends, and parallel to the gripping surface of the fourth finger part 72. By driving the gripper drive device 59, the direction of the fourth fingertip part 72b and the direction of the fourth finger main body part 72e are changed at the fourth rotary joints 72c and 72d.

The fourth finger part 72 has a shape which is suitable for entering and penetrating through the opening 73 of the third finger part 71. The third fingertip part 71b and the fourth fingertip part 72b include antiskid members 74. Further, the third bar-like parts 71aa and 71ab and the fourth bar-like parts 72aa and 72ab include antiskid members 75. Note that the third finger part 71 may have a configuration similar to that of the fourth finger part 72. In other words, the third finger part 71 may not have the opening 73.

The gripper drive device for the third gripper 70 is formed so that the directions of the bar-like parts 71aa, 71ab, 72aa, and 72ab are changed at the rotary joints 71c, 71d, 72c, and 72d. The gripper drive device drives the third finger part 71 and the fourth finger part 72 so that the third fingertip part 71b and the fourth fingertip part 72b move closer to each other. The third fingertip part 71b and the fourth fingertip part 72b can pinch the target object. The third fingertip part 71b and the fourth fingertip part 72b can grip the target object in the direction perpendicular to the direction in which the first fingertip part 61b and the second fingertip part 62b grip the target object.

The third gripper 70 can hold the target object from four directions when gripping the target object so as to pinch the same. However, when the gripper grips a cuboid connector to which a linear member is attached, the gripper cannot grip the connection surface of the connector and the surface from which the linear member is drawn. In the gripper, it is necessary to grip the connector by using four surfaces other than these two surfaces so as not to apply a load to the linear member. For example, the gripper is required to grip the connector so as not to drastically bend the linear member. The third gripper 70 can hold the four side faces of the connector, and accordingly, enhances stability in gripping the target object.

Figure 18:
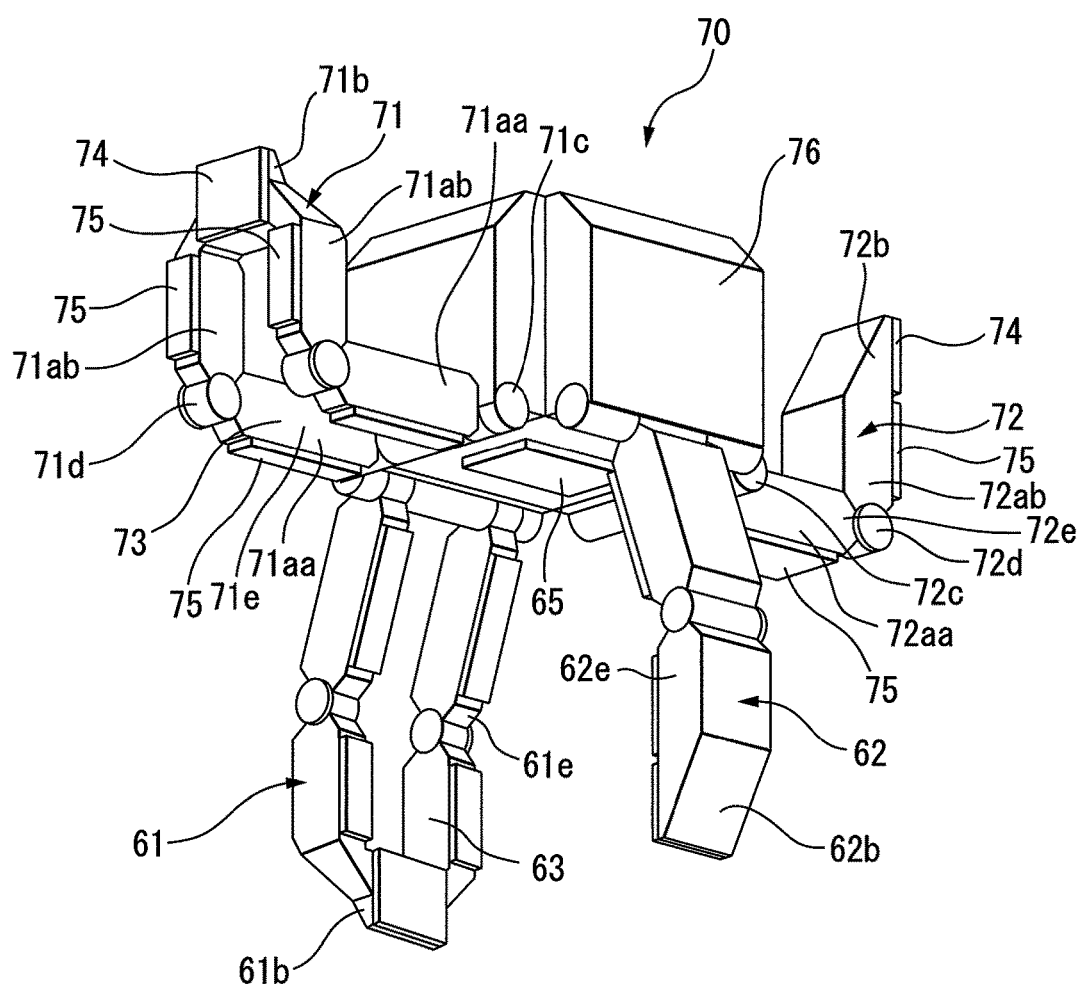
FIG. 18 is a perspective view of the third gripper in the embodiment, which grips a liner member.

FIG. 18 shows a perspective view of the third gripper in the present embodiment, which grips a linear member. When the third gripper 70 grips the linear member, one of two pairs of finger parts can face upward.

In the example shown in FIG. 18, the rotary joints 71c, 71d, 72c, and 72d are driven so as to cause the third fingertip part 71b of the third finger part 71 and the fourth fingertip part 72b of the fourth finger part 72 to face upward. This control causes the first finger part 61 and the second finger part 62 to grip the linear member in the same way as the second gripper 60.

Further, the third gripper 70 can grasp the target object so as to surround the target object by using the four finger parts 61, 62, 71, and 72. When, for example, gripping a spherical target object, the second gripper 60 provided with a pair of finger parts cannot stably grip the target object in some cases because it pinches the target object in one direction. In contrast, the third gripper 70 can stably grip target objects which have various shapes by using the four finger parts 61, 62, 71, and 72.

Figure 19:
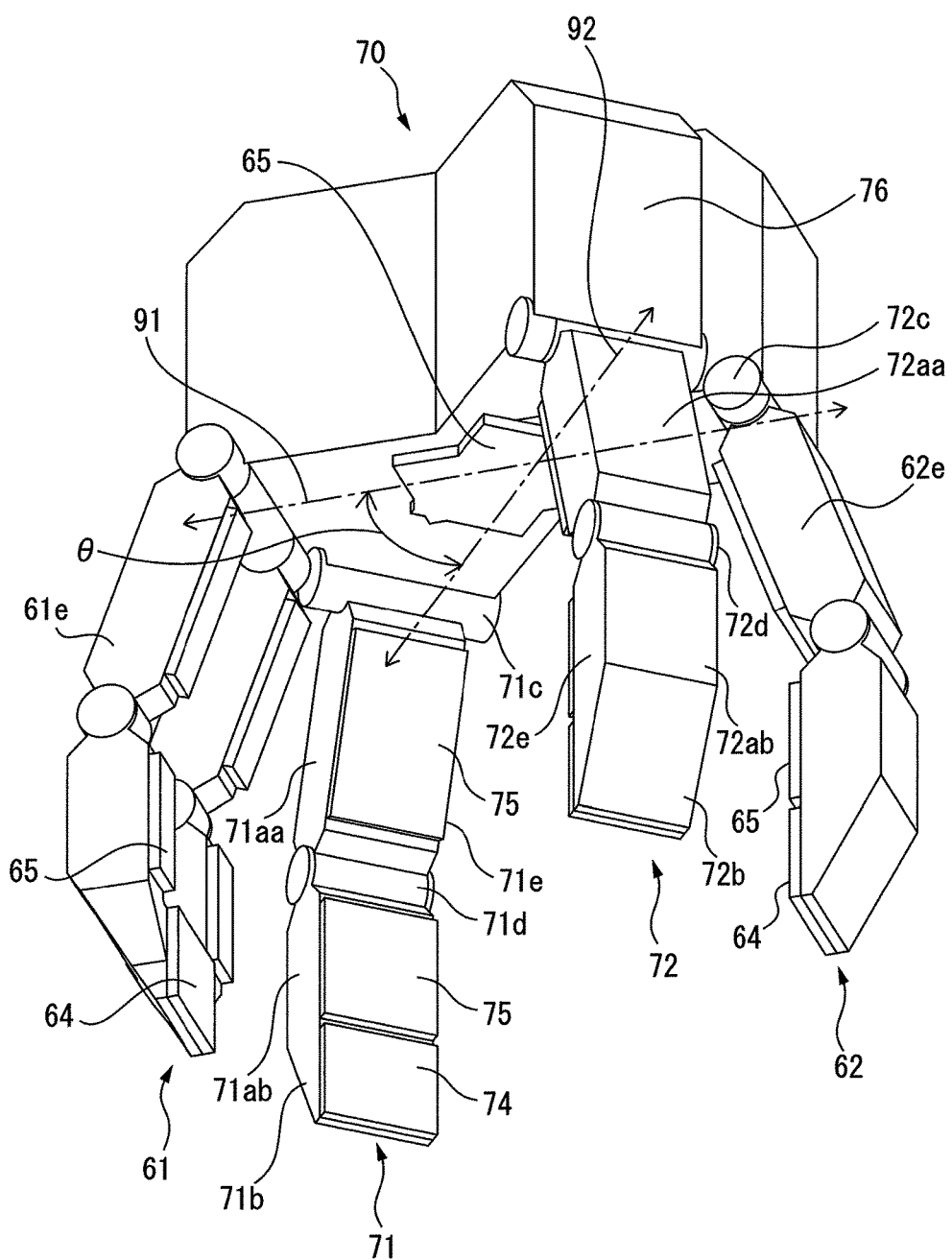
FIG. 19 is a perspective view of a modification of the third gripper in the embodiment.

FIG. 19 shows a perspective view of a modification of the third gripper in the present embodiment. A gripper 70 in the modification is provided with the first finger part 61, the second finger part 62, the third finger part 71, and the fourth finger part 72. The finger parts 61, 62, 71, and 72 are supported by the base part 76. The third finger main body part 71e of the third finger part 71 has no opening, and has one bar-like part 71aa and one bar-like part 71ab. Further, the third finger main body part 71e has the third rotary joint 71d for connecting the third bar-like part 71aa and the third bar-like part 71ab, and the third rotary joint 71c for connecting the third bar-like part 71aa to the base part 76.

In the third gripper shown in FIG. 17 and FIG. 18, the operation direction of the first finger part 61 and the second finger part 62 is perpendicular to the operation direction of the third finger part 71 and the fourth finger part 72. Note that the direction in which two finger parts are opposed corresponds to the operation direction of the finger parts. In contrast, in the modification shown in FIG. 19, the operation direction of the two pairs of finger parts are not perpendicular to each other. The direction designated by an arrow 91 is the operation direction of the first finger part 61 and the second finger part 62. The direction designated by an arrow 92 is the operation direction of the third finger part 71 and the fourth finger part 72. The operation directions of the two pairs of finger parts are not perpendicular to each other, and intersect at a predetermined angle θ. The modification of the third gripper is preferable for stably gripping a linear member. As seen above, the operation directions of the finger parts which are opposed to each other can be set at any directions.

The other configurations, operations, and effects of the third gripper are similar to those of the first gripper or the second gripper in the present embodiment.

In the above embodiments, in the first finger part, the second finger part, the third finger part, and the fourth finger part, antiskid members are disposed on all gripping surfaces for contacting the target object, but the configuration is not limited to this embodiment. The antiskid members can be disposed on some of the gripping surfaces for contacting the target object. Alternatively, no antiskid members may be disposed.

In the above embodiments, the target object to be transferred is, as an example, a cable harness, but is not limited to the cable harness. The gripper in the present embodiment can perform an operation for gripping the target object by pinching and an operation for gripping the target object by grasping. For example, the gripper according to the present invention can be adopted for a robot device which disposes linear articles and cuboid articles in the inside of one box. Alternatively, the gripper grips large target objects and small target objects in some cases. In an operation for gripping such a plurality of kinds of target objects, the gripper can grip a small target object so as to pinch the same by using its fingertip parts, and can grip a large target object so as to grasp the same by using its finger part main bodies.

According to the present invention, a gripping device, which has a function for grasping the target object by using finger part main bodies and a function for pinching the target object by using fingertip parts, can be provided.

The above embodiments can be appropriately combined. In the above figures, the same or similar portions are designated by the same reference numerals. Note that the above embodiments are examples, and do not limit the invention. Further, the embodiments include modifications of the features which are described in the claims.

The invention claimed is:

1. A gripping device attached to a robot, comprising:
a first finger part for contacting one side of a target object to be gripped;
a second finger part for contacting the other side of the target object, which is opposed to the first finger part;
a base part for supporting the first finger part and the second finger part; and
a drive part for driving at least one of the first finger part and the second finger part, wherein
the first finger part includes a first finger main body part which is supported by the base part and which has an opening, wherein the first main body part includes a plurality of bar-like parts, and a first fingertip part for contacting the target object, which is is permanently attached to ends of the plurality of bar-like parts;
the second finger part includes a second finger main body part supported by the base part, and a second fingertip part for contacting the target object, which is disposed at an end of the second finger main body part,
the first finger part and the second finger part are formed so that, when the drive part is driven based on a first motion command, the first fingertip part and the second fingertip part move closer to each other, and the first fingertip part and the second fingertip part grip the target object, and
the first finger part and the second finger part are formed so as to grip the target object when the drive part is driven based on a second motion command, with at least a part of the second finger part entering the inside of the opening, and the first finger main body part and the second finger main body part being in contact with the target object.

2. The gripping device according to claim 1, wherein the portion of the second fingertip part, which contacts the target object, has the same shape as the portion of the first fingertip part, which contacts the target object.

3. The gripping device according to claim 1, wherein the second finger part is formed so as to move in a direction in which the second finger part is closer to or away from the first finger part, and is formed so that the length of the portion projecting from the base part can be changed.

4. The gripping device according to claim 1, wherein
the first finger part includes first rotary joints having rotation axes which are perpendicular to a direction in which the first finger part extends and which are parallel to the gripping surface of the first finger part, and
direction of the first fingertip part and a direction of the first finger main body part are changed at the first rotary joints.

5. The gripping device according to claim 4, wherein
the first finger main body part includes a pair of the first rotary joints which simultaneously rotate the first fingertip part when a direction of the first fingertip part and a direction of the first finger main body part are changed, and
the paired first rotary joints are coaxially arranged and spaced from each other in a direction in which their rotation axes extend.

6. The gripping device according to claim 1, wherein
the second finger part includes second rotary joints having rotation axes which are perpendicular to a direction in which the second finger part extends and which are parallel to the gripping surface of the second finger part, and
a direction of the second fingertip part and a direction of the second finger main body part are changed at the second rotary joints, and the second finger part enters the inside of the opening of the first finger part.

7. The gripping device according to claim 1, comprising:
a third finger part including a third finger main body part supported by the base part, and a third fingertip part which is disposed at an end of the third finger main body part and which contacts the target object;
a fourth finger part including a fourth finger main body part which is opposed to the third finger part and which is supported by the base part, and a fourth fingertip part which is disposed at an end of the fourth finger main body part and which contacts the target object; and
a drive part for driving at least one of the third finger part and the fourth finger part, wherein
the third finger part and the fourth finger part move closer to each other in a direction perpendicular to a direction in which the first finger part and the second finger part move closer to and away from each other, in order to grip the target object.

8. The gripping device according to claim 7, wherein
the third finger part includes third rotary joints having rotation axes which are perpendicular to a direction in which the third finger part extends and which are parallel to the gripping surface of the third finger part, and
a direction of the third fingertip part and a direction of the third finger main body part are changed at the third rotary joints.

9. The gripping device according to claim 7, wherein
the fourth finger part includes fourth rotary joints having rotation axes which are perpendicular to a direction in which the fourth finger part extends and which are parallel to the gripping surface of the fourth finger part, and
a direction of the fourth fingertip part and a direction of the fourth finger main body part are changed at the fourth rotary joints.

10. The gripping device according to claim 1, comprising an antiskid member which is disposed on at least one of gripping surfaces for contacting the target object.

* * * * *